United States Patent [19]

Wilkinson et al.

[11] Patent Number: 5,794,206
[45] Date of Patent: Aug. 11, 1998

[54] METHOD AND SYSTEM FOR DISPLAYING ELECTRONIC DATA INTERCHANGES IN A COMPUTER

[75] Inventors: David J. Wilkinson, Dublin; Thomas A. Crable, Columbus; Norman K. Fry, Marysville, all of Ohio

[73] Assignee: Sterling Commerce, Inc., Dallas, Tex.

[21] Appl. No.: 643,622

[22] Filed: May 6, 1996

[51] Int. Cl.$^6$ .................................................. G06F 3/00
[52] U.S. Cl. ..................... 705/1; 705/26; 395/200.3; 345/349; 345/329; 345/962
[58] Field of Search ........................ 345/326–358; 395/200.3; 705/1, 16, 21–22, 24, 26, 27, 28, 30, 34, 35, 42, 10; 186/36

[56] References Cited

U.S. PATENT DOCUMENTS

| | | | |
|---|---|---|---|
| 5,285,383 | 2/1994 | Lindsey et al. | 705/26 |
| 5,315,508 | 5/1994 | Bain et al. | 705/28 |
| 5,424,938 | 6/1995 | Wagner et al. | 705/42 |
| 5,482,139 | 1/1996 | Rivalto | 186/36 |
| 5,555,496 | 9/1996 | Tackbary et al. | 705/27 |
| 5,570,291 | 10/1996 | Dudle et al. | 705/10 |
| 5,592,378 | 1/1997 | Cameron et al. | 705/27 |
| 5,631,827 | 5/1997 | Nicholls et al. | 705/28 |

*Primary Examiner*—John E. Breene
*Attorney, Agent, or Firm*—Baker & Botts, L.L.P.

[57] ABSTRACT

An interchange window (106) of a graphical user interface. The interchange window (106) may display at least one interchange entry (95). The interchange entry (95) is associated with an interchange (54) of an Electronic Data Interchange (EDI) message (50). The interchange window (106) may include a status icon (120) representing the status of the interchange (54). In accordance with another aspect of the present invention, the interchange window (106) may include a translation report sub-window (222) and a data set sub-window (220). Additionally, the interchange window (106) may display a functional group entry (96) associated with a functional group (60) of the interchange (54) and a document entry (98) associated with a document (66) of the interchange (54).

48 Claims, 5 Drawing Sheets

130

Interchange Process Status

✉ 140
Received

✉ 142
Sent

✉ 144
Ready to Send

✉ 146
Queued

✉ 148
Hold

⊘ 150
Overdue

132

Interchange Network Status

📡 160
On Network

📡 162
Network Warning

📡 164
Network Error

📡 166
Picked Up

📡 168
Transmitted to third-party network

134

Interchange, Group, and Document Acknowledgement Status

⧗ 180
Waiting

◯ 182
Overdue

⊘ 184
Rejected

✓+ 186
Acknowledged

✓- 188
Acknowledged with Errors

✓ 190
Partially Acknowledged

136

Document Compliance Status

📄 200
OK

📄 202
NotOK

📄 204
Duplicate

*FIG. 5*

METHOD AND SYSTEM FOR DISPLAYING ELECTRONIC DATA INTERCHANGES IN A COMPUTER

TECHNICAL FIELD OF THE INVENTION

This invention relates generally to computer transactions, and more particularly to an improved system for, and method of, displaying Electronic Data Interchanges in a computer.

BACKGROUND OF THE INVENTION

Historically, business transactions have been conducted on paper. In fact, the development of written language is attributed to the needs of business. Thousands of years ago traders and merchants physically recorded accounts of transactions. Written language helped to standardize the transactions and smooth communication.

Unfortunately, paper and manual processes associated with "pushing" paper around are an incredible bottleneck. Paper-pushing is also time-consuming, inefficient and ill-equipped to handle the large flow of data between companies that occurs across the globe today. The one-way exchange of data on paper may take between five and eight days. Additionally, this method is susceptible to human error.

The 1960's heralded the wide spread use of computers for commercial business applications, such as inventory systems, accounting systems and others. The use of computers gave rise to Electronic Data Interchanges (EDI). EDI is the computer-to-computer exchange of business transactions, such as purchase orders, invoices and shipping notices.

The pioneers of EDI established proprietary formats (standards that were different for each trading partner). The difficulty in maintaining many different formats that accomplish the same task led some industry groups to form coalitions to develop industry-based EDI standards for purchasing, transportation, and financial applications. By the late 1970's, national EDI standards were developed that regulate the syntax, structure, and content of the transaction data.

Today, EDI is one of the most competitive tools available in the business world. Industry analysts predict that the EDI market will soon surpass $1.9 billion. The substantial use of EDI is driven by many factors, including just-in-time manufacturing schedules, customer-service demands, partnering with another company or sharing information systems, increasingly competitive business environments, and the need to establish and maintain the competitive advantage.

A typical EDI communication progresses as follows. An initiating system encodes one or more business transactions into an EDI message and transmits the message over a network. The initiating system generally logs the message for future reference. A recipient system translates the EDI message into a format compatible with the recipient system. For example, a supplier may receive an order in EDI format and translate that order into a format compatible with the supplier's order processing and invoicing systems. The recipient system commonly generates a translation report for the EDI message and logs the message for future reference.

Existing EDI methods and systems provide listings with which a user may reference logged EDI messages. These listings, however, typically include only basic information about the messages, such as the opposite party in the transaction and the transaction date. Information concerning the EDI data, the translation report, and the current status of the messages is not provided.

SUMMARY OF THE INVENTION

In accordance with the present invention, a method and system is provided that substantially eliminates or reduces the disadvantages and problems associated with the prior art.

In accordance with the present invention, a window of a graphical user interface comprises an interchange window. The interchange window may display at least one interchange entry associated with an interchange of an Electronic Data Interchange (EDI) message. The interchange window may also display a status icon representing the status of the interchange. More specifically, the icon may represent a processing status, an acknowledgment status, a compliance status or a network status of the interchange. The status icon may be updated each time a status update is received for the interchange. In addition to the icon, the interchange window may include a status bar that recites the status of the interchange.

In accordance with another aspect of the present invention, the interchange window may include a data set sub-window. The data set sub-window may display a data set of the interchange. Additionally, the interchange window may include a translation report sub-window. The translation report sub-window may display a translation report of the interchange. More specifically, the data set sub-window may also display a data set of a document associated with the interchange. Similarly, the translation report sub-window may display a translation report of the document.

In accordance with yet another aspect of the present invention, the interchange window may display a functional group entry associated with a functional group of the interchange. Moreover, the interchange window may also display a document entry associated with a document of the interchange.

Important technical advantages of the present invention include providing an improved method and system for displaying EDI data in a computer. In particular, an interchange window may display the status, functional groups and documents of an interchange. With this information, a user may more efficiently utilize, manipulate and otherwise process interchanges.

Another important technical advantage of the present invention includes providing the translation report sub-window in the interchange window. The translation report sub-window allows the user to view translation reports of interchanges in the same window as the interchange entries. Still another technical advantage of the present invention includes providing a data set sub-window in the interchange window. The data set sub-window allows the user to directly view EDI format data of interchanges along with the interchanges and the translation reports. Accordingly, a user may more efficiently isolate and correct translation and other transmission problems.

Other technical advantages will be readily apparent to one skilled in the art from the following figures, descriptions, and claims.

BRIEF DESCRIPTION OF THE DRAWINGS

For a more complete understanding of the present invention, and the advantages thereof, reference is now made to the following description taken in conjunction with the accompanying drawings, in which:

FIG. 5 illustrates various status icons that may be displayed in the user interface of FIG. 4.

DETAILED DESCRIPTION OF THE INVENTION

Turning first to the nomenclature of the specification, the detailed description which follows is represented largely in terms of processes and symbolic representations of operations by conventional computer components, including a central processing unit (CPU) associated with a general purpose computer system, memory storage devices for the CPU, and connected pixel-oriented display devices. These operations include the manipulation of data bits by the CPU and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, although not necessarily, these quantities take the form of electrical, magnetic, or optical signals capable of being stored, transferred, combined, compared or otherwise manipulated. It is conventional for those skilled in the art to refer to these signals as bits, values, elements, symbols, characters, terms, numbers, records, files or the like. It should be kept in mind, however, that these and some other terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc., which are often associated with manual operations performed by a human operator. It must be understood that no involvement of a human operator is necessary or even desirable in the present invention. The operations described herein are machine operations performed in conjunction with a human operator or user that interacts with the computer.

In addition, it should be understood that the programs, processes, methods, etc. described herein are not related or limited to any particular computer or apparatus. Rather, various types of general purpose computing machines or devices may be used with programs constructed in accordance with the teachings described herein. Similarly, it may prove advantageous to construct specialized apparatus to perform the method steps described herein by way of dedicated computer systems with hardwired logic or programs stored in non-volatile memory, such as read only memory.

Figure 1:
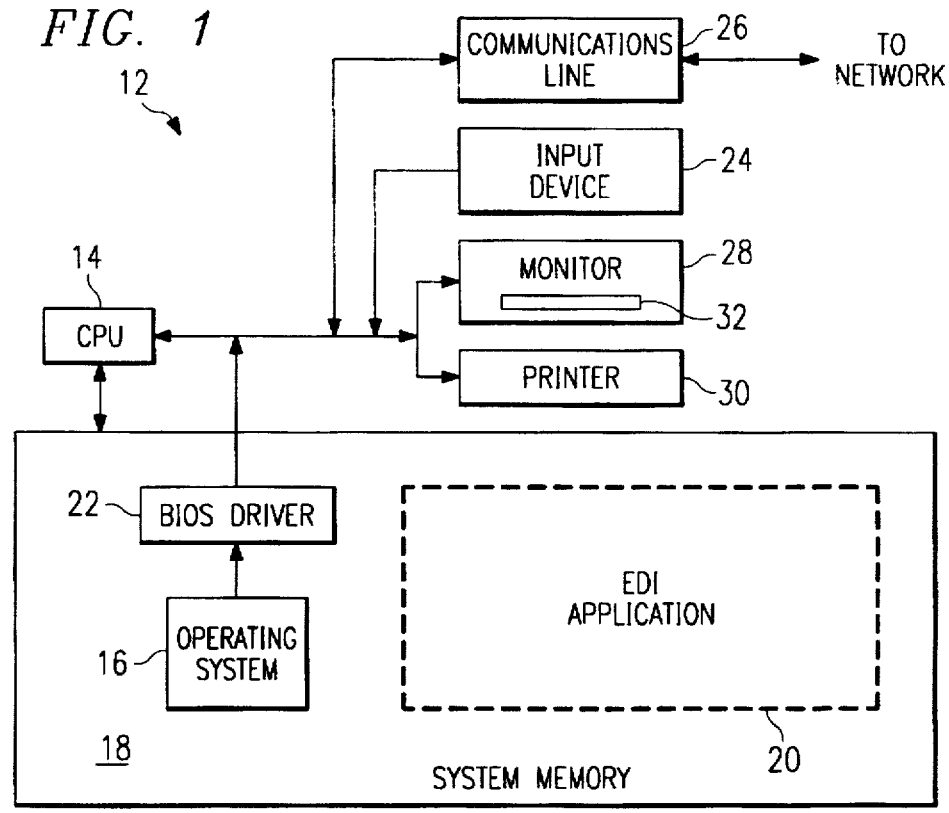
FIG. 1 illustrates a schematic block diagram of a computer system that may be used for displaying Electronic Data Interchanges (EDI) in accordance with the present invention.

The preferred embodiment of the present invention and its advantages are best understood by referring now to FIGS. 1 through 6 of the drawings in which like numerals refer to like parts throughout the several views. FIG. 1 is a schematic block diagram of the components of a preferred operating environment, a computer system 12. The computer system 12 comprises a central processing unit (CPU) 14 that operates the computer system in conjunction with an operating system 16 to retrieve, process, store, and display data.

The CPU 14 is typically implemented as a microprocessor, such as that manufactured by Apple Computer or by Intel Corporation. The CPU 14 communicates control, address, and data signals with the operating system 16 and with the remaining components of the computer system 12 through a system bus.

The operating system 16 comprises a set of computer programs that control the internal functions of the computer system 12, thereby allowing the computer system to run application software. The operating system 16 is typically installed in the mass storage device, such as a hard disk drive, a floppy disk drive, a CD disk drive, or a ROM chip. During boot-up (initialization) of the computer system 12, the operating system 16 is loaded into a system memory 18.

A computer-implemented application program 20 is also loaded into the system memory 18 from a hard disk drive, a floppy disk drive, or a CD disk drive. The application 20 may be an Electronic Data Interchange (EDI) application or other program capable of receiving, transmitting and translating computer-to-computer exchanges of business transactions.

A basic input/output system (BIOS) driver 22 is stored in system memory 18 along with the operating system 16 and the application program 20. The BIOS driver 22 supplies the device-level control and support services for primary input/output devices of the computer 12 during the boot process. After a boot, the BIOS driver 22 accepts requests from the application program 20 and from the operating system 16 running on the computer system 12 and performs input/output services as requested by those programs. The functions and operations of conventional BIOS drivers are well known and will not be further described.

The application program 20 operates in conjunction with the operating system 16 to transmit and receive information. Information may be received from a user through an input device 24 or from another computer system through a communications link 26. The input device 24 may be a keyboard, a mouse, a track pad, or the like. The communications link 26 may be a network interface card for connection to a local area network (LAN) or to a larger national or international network, a modem for connection to telephony links, or another type of device that enables data transfer between computers.

The application program 20 is called by the operating system 16 upon request by a user. Data may be passed from the application program 20 to the CPU 14 and BIOS driver 22 by operating system 16. Data may be displayed electronically by a monitor 28 or a hard copy may be generated by a printer 30 as a result of data sent from the operating system 16 to the BIOS driver 22. Data may also be transmitted to another computer system through the communications link 26.

Preferably, the application 20 communicates with a user through a window 32 of a graphical user interface (GUI). A graphical user interface is a type of display format that enables the user to choose commands, start programs and see a list of files and other information by pointing to icons and lists of menu items on a screen. As used herein, the term "icon" means a small graphics image displayed on a screen to represent information or an object to the user.

According to a specific embodiment of the present invention, the computer system 12 may be an "INTEL" platform manufactured by Compaq Computer. The application 22 may be implemented as an EDI application, such as "GENTRAN-DIRECTOR" manufactured by Sterling Software. In this embodiment, as described in more detail below, the computer system 12 receives an EDI message over the communications link 26. The EDI message may be received in a number of standardized formats. The user of the computer system 12 may define specific formats for which the computer system 12 will accept incoming messages over the communications link 26.

After the EDI message has been received over the communications link 26, the computer system 12 checks the message for compliance with one or more data standards. If the message is in one of the formats that the user of the computer system 12 expects the data to be in and has defined, the message is placed in a storage area for compliant data. If the message is in an unrecognized format, i.e., does not comply with one of the standards defined by the user of the computer system 12, then the message is placed in a storage area for non-compliant input data.

Figure 2:
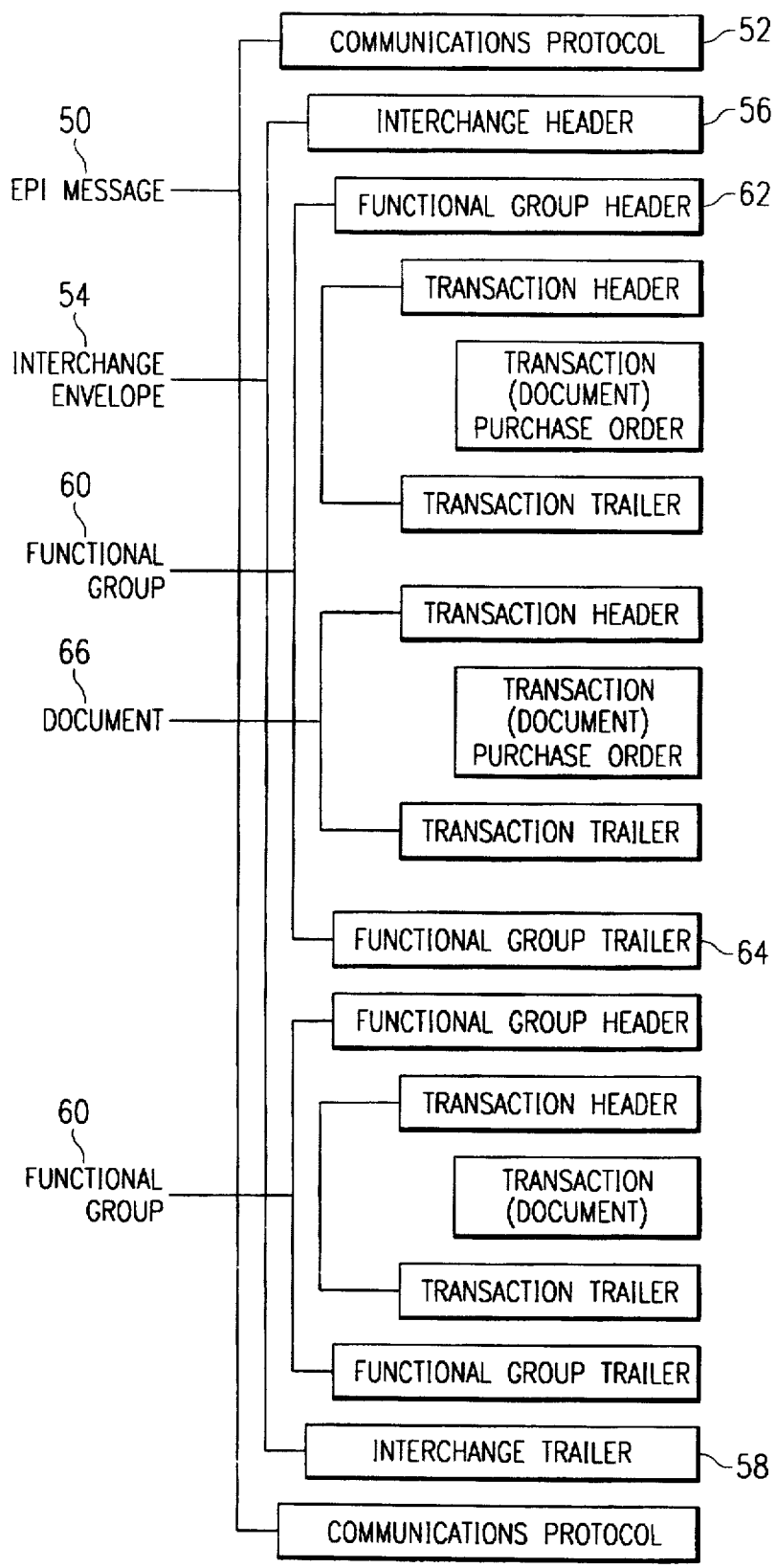
FIG. 2 illustrates the general structure of an EDI message.

FIG. 2 illustrates a typical EDI message 50. The EDI message 50 contains a communications protocol 52 and an interchange envelope 54. The communications protocol 52 informs the computer system 12 of the specific EDI format with which the message is encoded. The interchange envelope 54 contains an interchange header 56 and an interchange trailer 58, and all the data sent from one sender to one receiver in the same transmission.

The interchange header 56 generally contains a control number identifying the particular interchange envelope 54, in addition to other data used in the interpretation and transmission of the data contained in the envelope. The interchange trailer 58 generally contains the same control number as the header 56, as well as a count of the number of units in the interchange envelope 54.

At the next level of the EDI message 50, the interchange envelope 54 may contain one or more functional groups 60. The functional groups 60 each surround a group of transactions of the same type. Each functional group 60 contains a functional group header 62 and a functional group trailer 64. The final level of the EDI message 50 is the actual tractions, or documents 58, which are organized by type inside the functional groups 66. Each document 66 contains a header 68 and a trailer 70.

Figure 3:
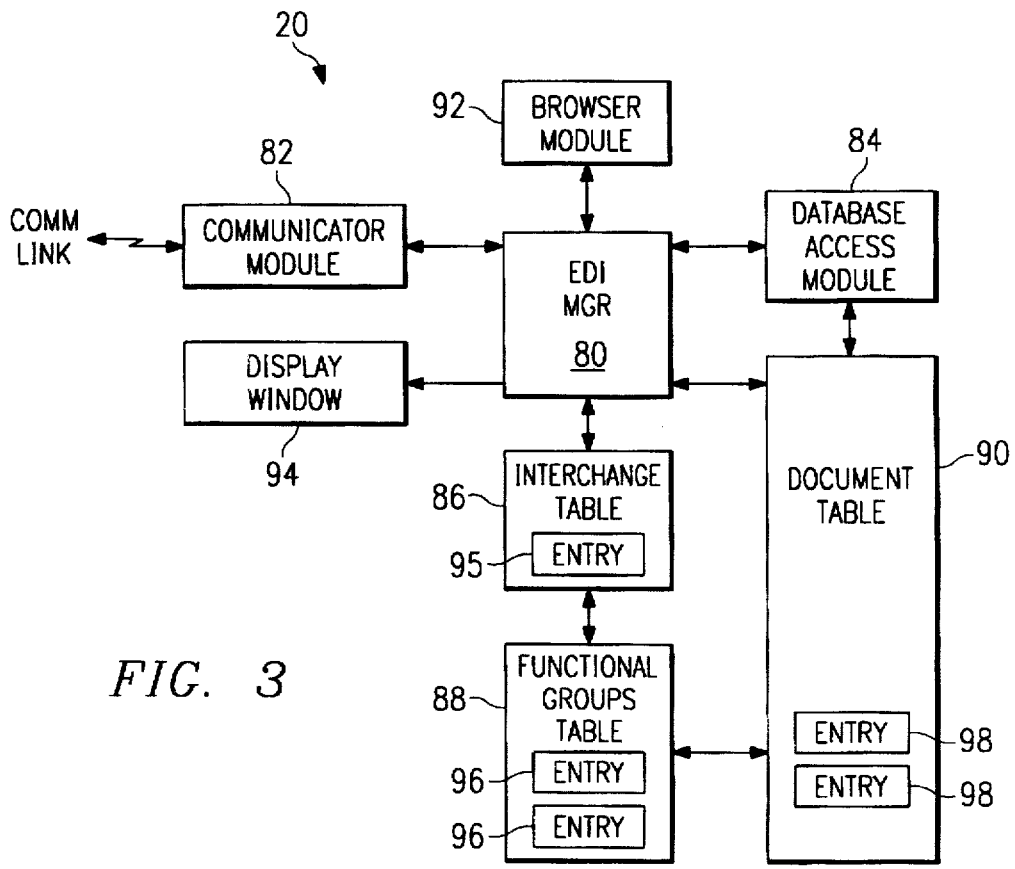
FIG. 3 illustrates a schematic block diagram of one embodiment of the EDI application of FIG. 1.

FIG. 3 illustrates one embodiment of the EDI application 20 for managing EDI communications in accordance with the present invention. As shown by FIG. 3, the EDI application 20 comprises an EDI manager 80, a communicator module 82, a database access module 84, an interchange data storage 86, a functional group data storage 88, a document data storage 90, a browser module 92, and a display window 94. The EDI manager 80 communicates with each of the software modules and controls the operation of the EDI application 20. Each software module may be a file, series of files, procedure, series of procedures, or a series of statements within a procedure in a computer software program.

The communicator module 32 connects to the communications link 26 (FIG. 1) and receives incoming EDI messages and sends out outgoing EDI messages. EDI messages received or to be sent out may be stored in the system memory 18 or on a mass storage device, such as a hard disk drive. When an EDI message is received by the communicator module 82, the EDI manager 80 checks the message for compliance. If EDI manager 80 determines that the EDI message is non-compliant, then the EDI manager 80 and the database access module 84 may cause the EDI message to be stored in a "non-compliant" data storage.

If the message is compliant with one of the predefined formats, then the EDI manager 80 and the database access module 84 cause an interchange entry 95 associated with the interchange 54 of the message 50 to be stored in the interchange table 86. The interchange table 86 may reside in a portion of the system memory 18 or on the hard disk drive. The EDI manager 80 and the database access module 84 may also cause a functional group entry 96 associated with a functional group 60 of the interchange 54 to be stored in the functional group table 88. A document entry associated with a document 66 of the interchange 54 may be stored in the document table 90. The functional group table 88 and the document table 90 may each reside in a portion of the system memory 18 or on a hard disk drive.

Similarly, when the user desires to send an EDI message over the communicator module 82, the EDI manager 80 first checks the message for compliance. If the message is compliant with one of the predefined formats, then the EDI manager 80 and the database access module 84 cause an interchange entry 95 associated with the interchange 54 of the message 50 to be stored in the interchange table 86. The EDI manager 80 and the database access module 84 may also cause functional group entries 96 and document entries 98 associated with the groups 60 and 66 documents of the interchange 54 to be stored in the functional group table 88 and in the document table 90, respectively.

If the EDI manager 80 determines that the EDI message is non-compliant, then the EDI manager 80 and the database access module 84 may cause the EDI message to be stored in a "non-compliant" data storage. When the user of the computer system 12 is working on an EDI message, the EDI manager 80, in cooperation with database access module 84, may cause interchange to be stored in a "workspace" data storage.

The EDI manager 80 is an event-driven application. Every time an EDI message 50 or other data is sent or received using the communicator module 82, an event is generated that is monitored by the EDI manager 80. Similarly, each time a user of the computer system 12 begins to work on a message or ceases work on a message, an event is generated within the EDI manager 80. Each time a user begins to process a received message or indicates that a message is to be output, the EDI manager 80 generates an event. The browser module 92 monitors each of the events and maintains the status of the GUI window 32. When the browser module 92 is notified by the EDI manager 80 that one of the above events has occurred, (i.e., input, output, processing of input data items indicating items to be output, or beginning or ending work on a document) the browser module 92 determines whether the GUI window 32 needs to be updated. If the GUI window 32 needs to be updated, the browser module 92 notifies the EDI manager 80 of the need to update the GUI window 32 by generating an event.

After the EDI manager 80 receives an event indicating that the GUI window 32 must be updated, it generates the appropriate instructions to the display window 94 to update the GUI window 32. In this embodiment, the GUI window 32 is an MDI (multiple document interface) child window as provided by the Microsoft Windows™ operating system.

Figure 4:
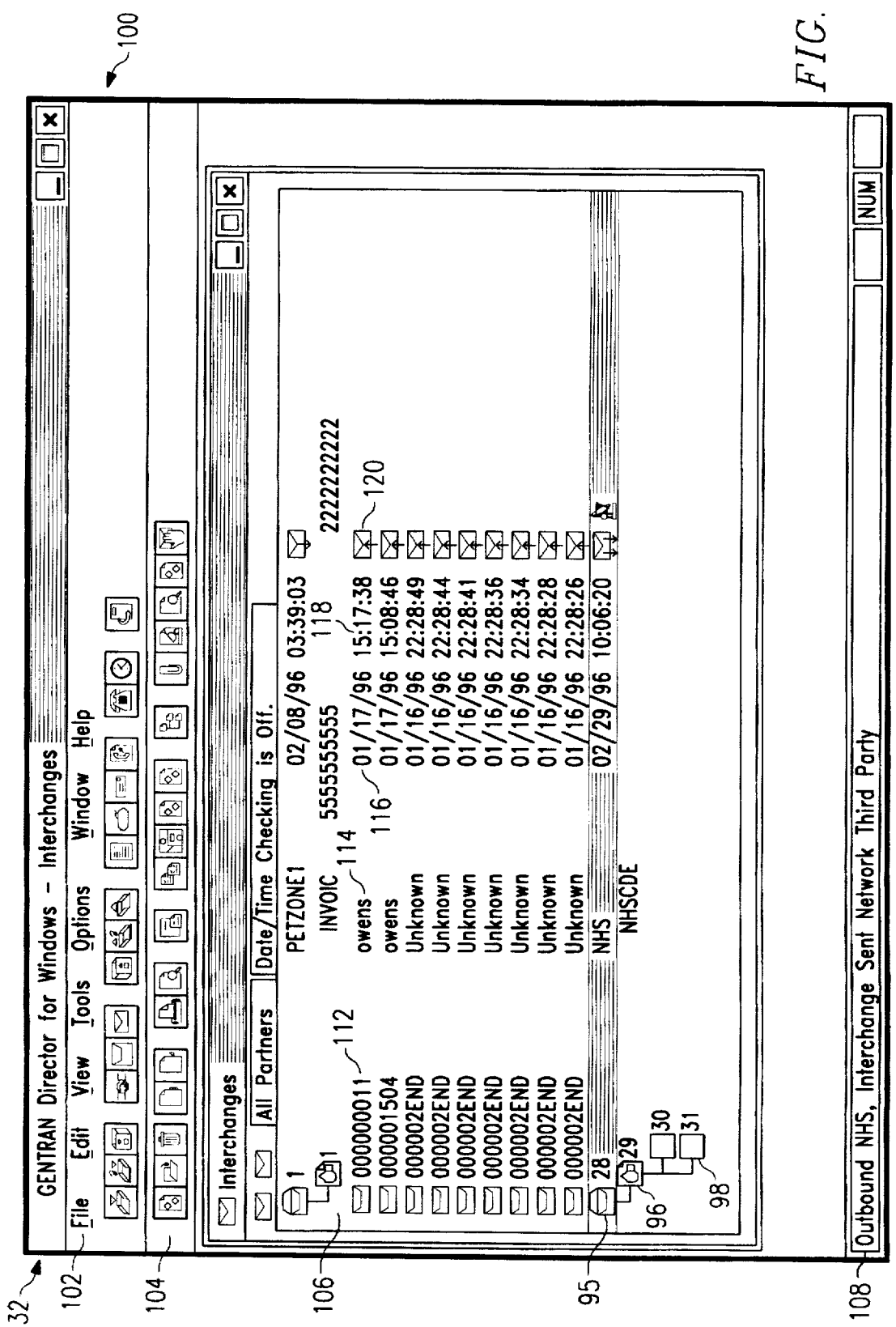
FIG. 4 illustrates a user interface displaying the status of EDI messages in accordance with the present invention.

FIG. 4 illustrates one embodiment of the GUI window 32 for displaying EDI messages in accordance with the present invention. The GUI window 32 may include a menu bar 100 with a variety of pull down menus 102 disposed along the top edge of the screen. A tool bar 104 may be disposed immediately below the menu bar 100.

The GUI window 32 may also include an interchange window 106 and a status bar 108. The interchange window 106 includes a list of interchange entries 95 associated with interchange 54 of the EDI messages 50. For each interchange entry 95, the interchange window 106 may provide a control number 112 and a name 114 of the opposite party in the transaction. A date 116 and a time 118 of the interchange 54 may also be provided in the interchange window 106.

In accordance with the present invention, the interchange window 106 may also include an icon 120 representing the status of an interchange 54 and a status bar 108 reciting the status of the interchange 54.

FIG. 5 illustrates exemplary status icons that may be used to represent the status of an interchange in accordance with the present invention. It will be understood by those skilled in the art, however, that some, additional, or other icons may be used in connection with the present invention.

As shown by FIG. 5, the interchange display 106 may include interchange process status icons 130, interchange network status icons 132, interchange, group, and document acknowledgment status icons 134 and document compliance status icons 136. The interchange process status icons 130 may include a received icon 140, a sent icon 142, a ready-to-send icon 144, a queued icon 146, a hold icon 148 and an overdue icon 150. The received icon 140 indicates that the interchange 54 was received by the system 12. The sent icon 142 indicates that the interchange 54 was successfully transmitted to the appropriate partner. The ready-to-send icon 144 indicates that an attempt was made to send the interchange 54, but the communication session was not successful. In such a case, the interchange 54 will be sent during the next appropriate communication session. The queued icon 146 indicates that the document is queued to send. The hold icon 148 indicates that a document is on hold, i.e., will not be sent. The overdue icon 150 indicates that the interchange 54 is waiting to be reconciled with an inbound functional acknowledgment but has exceeded the number of hours by which that acknowledgment is deemed late.

The interchange network status icons 132 may include an on network icon 160, a network warning icon 162, a network error icon 164, a picked up icon 166 and a transmitted to third party network icon 168. The on network icon 160 indicates that the interchange 54 was successfully delivered to a value-added network. The network warning icon 162 indicates that the interchange 54 was delivered to a value-added network and that the network detected non-critical errors in the data. The network error icon 164 indicates that the interchange 54 was delivered to a value-added network and the network detected critical errors in the data. The picked up icon 166 indicates that the interchange 54 was successfully delivered to a trading partner via a value-added network. The transmitted to third party icon 168 indicates that the interchange 54 was transmitted to a third-party network.

Interchange, group, and document acknowledgment status icons 134 may include a waiting icon 180, an overdue icon 182, a rejected icon 184, an acknowledged icon 186, an acknowledged with errors icon 188 and a partially acknowledged icon 190. The waiting icon 180 indicates that the interchange 54 is waiting to be reconciled with an inbound functional acknowledgment. The overdue icon 182 indicates that the interchange 54 is waiting to be reconciled with an inbound functional acknowledgment but has exceeded the number of hours by which that acknowledgment is deemed late. The rejected icon 184 indicates that the interchange 54 was acknowledged by the trading partner, that there were errors and that the interchange was rejected by the partner. The acknowledged icon 186 indicates that the interchange 54 was acknowledged by the trading partner and that there were no errors. The acknowledged with errors icon 188 indicates that the interchange was acknowledged by a trading partner and that there were errors. In this case, the interchange 54 was accepted by the partner in spite of the errors. The partially acknowledged icon 190 indicates that the interchange 54 was successfully received by a trading partner and some of the documents within the interchange 54 were accepted or accepted with errors and other documents within the interchange 54 were rejected.

The document compliant status icons 136 may include an OK icon 200, a not OK icon 202, and a duplicate icon 204. The OK icon 200 indicates that the documents are fully compliant with the EDI standard and are eligible for further processing. The not OK icon 202 may indicate that document failed to comply with the EDI standard. If this is the cause of the error, the error will be indicated in a translator report associated with the document. The not OK icon 202 may also indicate that the document could not be associated with a specific trading partner. In this case, the partner listed for the document in question will be "unknown." The not OK icon 202 may further indicate that a suitable trading relationship or translation template could not be associated with the document. The not OK icon 202 may also indicate that a major error occurred while processing the interchange 54, functional group 60, or transaction level envelope structures. This error may include header and trailer control numbers that do not match, an invalid trailer control count, or a control number sequence checking error. If any of these errors occur, they will be listed in the translator report for the interchange 54 containing the document. The duplicate icon 202 indicates that the document has the same name as another document on the system 12.

Returning to the GUI window 32 of FIG. 4, the interchange window 106 may also display the functional group entries 96 and the document entries 98 of each interchange. In one embodiment, the interchange window 106 defaults to displaying only the interchange entries 95. In this embodiment, the functional group entries 96 of an interchange may be displayed by selecting the interchange entry 95. In response to a selection, the EDI manager 80 reads the functional group table 88 and displays the functional group entries 96 of the selected interchange 54. An interchange entry 95 may be selected by double-clicking the entry with a mouse or other pointing device. Those skilled in the art, however, will understand that other means may be used to select interchange entry 95.

The document entries 98 of an interchange entry 95 may be displayed by selecting a functional group entry 96. In response, the EDI manager 80 reads the document table 90 and displays the document entries 98 of the selected functional group 60. Accordingly, the interchange window 106 of the invention may display the status, functional groups and documents of the interchange 54.

Figure 6:
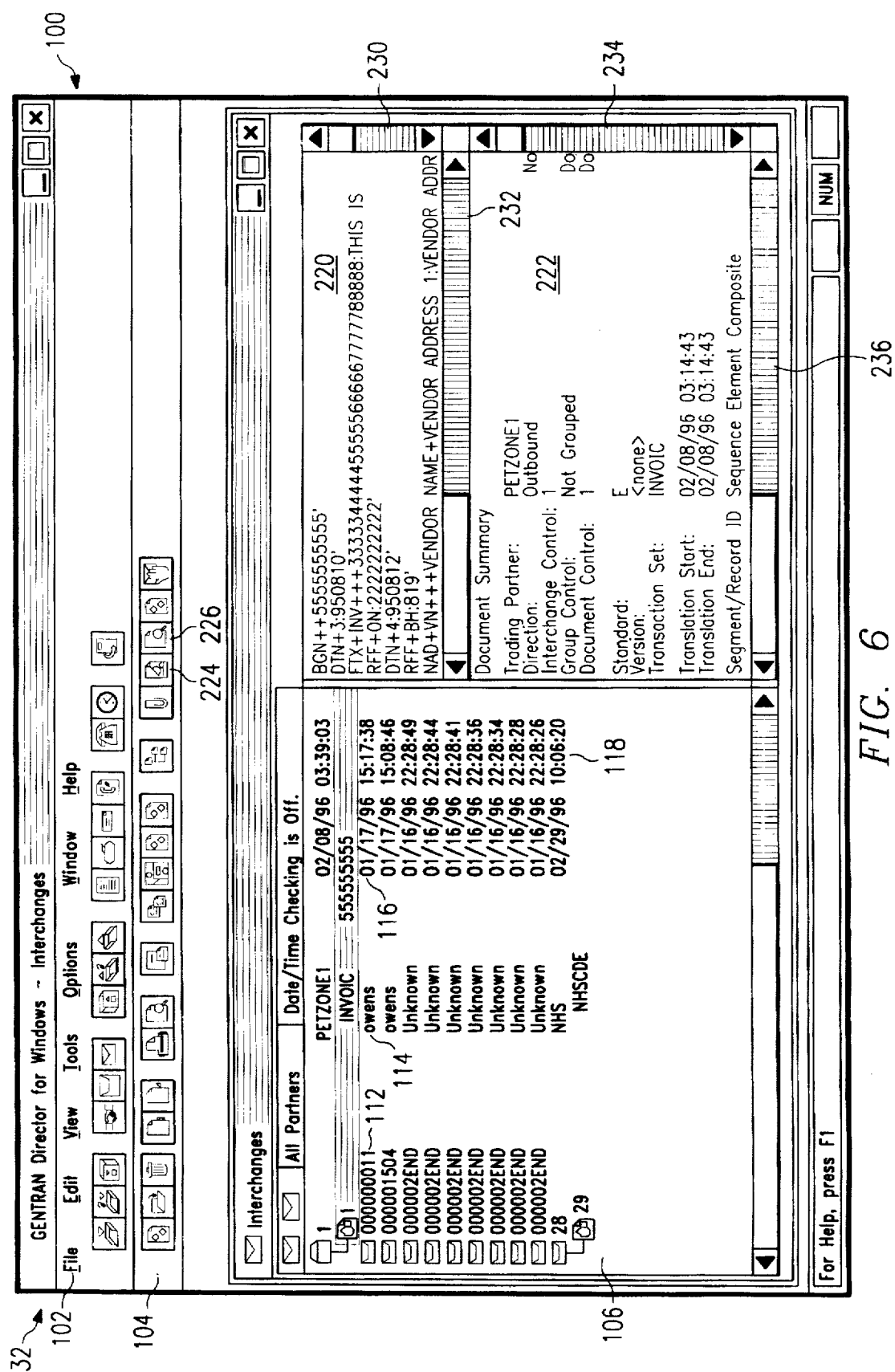
FIG. 6 illustrates a user interface displaying a data set sub-window and a translation report sub-window for EDI messages in accordance with the present invention.

In accordance with another aspect of the present invention, sub-windows may be disposed in the interchange window 106 for displaying detailed components of EDI messages. FIG. 6 illustrates a data set sub-window 220 and a translation report sub-window 222 disposed within the interchange window 106. The data set sub-window 220 may be displayed by activating an associated data set tool bar button 224 of the tool bar 104. Similarly, the translation report sub-window 222 may be displayed by activating an associated translation report tool bar button 226 of the tool bar 104.

The data set sub-window 220 may display EDI data for an interchange 54 or for a document 66. The EDI data for an interchange 54 may be displayed by selecting the interchange entry 95 of that interchange 54. In response to a selection, the EDI manager 80 reads the file for the interchange 54 and displays the data in the data set sub-window 220. Similarly, the EDI data of a document 66 may be displayed by selecting the document entry 98 of that document 66. In response, the EDI manager 80 reads the file for the document 66 and displays the data in the data set sub-window 220. Accordingly, the EDI data may be directly viewed from the interchange window 106. This allows the user to better isolate and correct problems associated with the EDI data of an interchange 54 or document 66.

The data set sub-window 220 may include a vertical scroll bar 230 positioned along the right edge of the sub-window 220. A horizontal scroll bar 232 may be positioned along the bottom edge of the sub-window 220. The scroll bars allow a user to scroll through the EDI data displayed in the data set sub-window 220.

The translation report sub-window 222 displays a translation report of an interchange 54 or of a document. The translation report of an interchange 54 may be displayed by selecting the interchange entry 95 of the interchange 54. In response, the EDI manager 80 reads the translation report for the interchange 54 and displays the report in the translation report sub-window 222. Similarly, the translation report of a document 66 may be displayed by selecting the document entry 98 of the document 66. In response, the EDI manager 80 reads the translation report of the document 66 and displays the report in the translation report sub-window 222. Accordingly, translation reports may be directly viewed from the interchange window 106. This allows a user to better solve problems. The translation report sub-window 222 may also include a vertical scroll bar 234 positioned along the right edge of the translation report sub-window 222. A horizontal scroll bar 236 may be provided along the bottom edge of the translation report sub-window 222. The scroll bars allow a user to scroll through a translation report displayed in the translation report sub-window 222.

From the foregoing description of the present invention, other alternative constructions may suggest themselves to those skilled in the art. Therefore, the scope of the present invention is to be limited only by the claims below and the equivalence thereof.

What is claimed is:

1. A window of a graphical user interface, comprising:
   an interchange window operable to display at least one interchange entry associated with an interchange of an EDI message; and
   the interchange window further operable to display a status icon representing the status of the interchange.

2. The window of claim 1, wherein the icon represents a processing status of the interchange.

3. The window of claim 1, wherein the icon represents an acknowledgment status of the interchange.

4. The window of claim 1, wherein the icon represents a compliance status of the interchange.

5. The window of claim 1, wherein the icon represents a networking status of the interchange.

6. The window of claim 1, further comprising a status bar operable to recite the status of the interchange.

7. The window of claim 1, further comprising the interchange window operable to display a functional group entry associated with a functional group of the interchange.

8. The window of claim 1, further comprising the interchange window operable to display a document entry associated with a document of the interchange.

9. The window of claim 1, further comprising:
   the interchange window operable to display a document entry associated with a document of the interchange; and
   the interchange window further operable to display a status icon representing the status of the document.

10. The window of claim 9, further comprising a status bar operable to recite the status of the document.

11. The window of claim 1, further comprising:
    a data set sub-window disposed in the interchange window; and
    the data set sub-window operable to display a data set of the interchange.

12. The window of claim 11, further comprising:
    the interchange window operable to display a document entry associated with a document of the interchange; and
    the data set sub-window further operable to display a data set of the document.

13. The window of claim 1, further comprising:
    a translation report sub-window disposed in the interchange window; and
    the translation report sub-window operable to display a translation report of the interchange.

14. The window of claim 13, further comprising:
    the interchange window operable to display a document entry associated with a document of the interchange; and
    the translation report sub-window further operable to display a translation report of the document.

15. The window of claim 1, further comprising:
    a data set sub-window disposed in the interchange window, the data set sub-window operable to display a data set of the interchange; and
    a translation report sub-window disposed in the interchange window, the translation report sub-window operable to display a translation report of the interchange.

16. The window of claim 15, further comprising:
    the interchange window operable to display a document entry associated with a document of the interchange; and
    the data set sub-window further operable to display a data set of the document.

17. The window of claim 15, further comprising:
    the interchange window operable to display a document entry associated with a document of the interchange; and
    the translation report sub-window further operable to display a translation report of the document.

18. A window in a graphical user interface, comprising:
    an interchange window operable to display at least one interchange entry associated with an interchange of an EDI message; and
    a data set sub-window disposed in the interchange window, the data set sub-window operable to display a data set of the interchange.

19. The window of claim 18, further comprising:

the interchange window operable to display a document entry associated with a document of the interchange; and the data set sub-window further operable to display a data set of the document.

20. The window of claim 18, further comprising a translation report sub-window disposed in the interchange window, the translation report sub-window operable to display a translation report of the interchange.

21. The window of claim 20, further comprising:

the interchange window operable to display a document entry associated with a document of the interchange; and the translation report sub-window further operable to display a translation report of the document.

22. The window of claim 18, further comprising the interchange window operable to display a functional group entry associated with a functional group of the interchange.

23. The window of claim 18, further comprising the interchange window operable to display a document entry associated with a document of the interchange.

24. A window in a graphical user interface, comprising:

an interchange window operable to display at least one interchange entry associated with an interchange of an EDI message; and a translation report sub-window disposed in the interchange window, the translation report sub-window operable to display a translation report of the interchange.

25. The window of claim 24, further comprising:

the interchange window operable to display a document entry associated with a document of the interchange; and the translation report sub-window further operable to display a translation report of the document.

26. The window of claim 24, further comprising the interchange window operable to display a functional group entry associated with a functional group of the interchange.

27. The window of claim 24, further comprising the interchange window operable to display a document entry associated with a document of the interchange.

28. A window in a graphical user interface, comprising:

an interchange window operable to display at least one interchange entry associated with an interchange of an EDI message; and the interchange window operable to display a functional group entry associated with a functional group of the interchange.

29. The window of claim 28, further comprising the interchange window operable to display a document entry associated with a document of the interchange.

30. A window in a graphical user interface, comprising:

an interchange window operable to display at least one interchange entry associated with an interchange of an EDI message; and the interchange window operable to display a document entry associated with a document of the interchange.

31. A method for displaying EDI messages in a computer, comprising the steps of:

displaying an interchange window including at least one interchange entry associated with an interchange of an EDI message; and displaying a status icon representing the status of the interchange.

32. The method of claim 31, further comprising the steps of:

receiving a status update of the interchange; and updating the status icon.

33. The method of claim 31, further comprising the step of displaying a functional group entry associated with a functional group of the interchange.

34. The method of claim 31, further comprising the step of displaying a document entry associated with a document of the interchange.

35. The method of claim 31, further comprising the step of displaying a status icon representing the status of the document.

36. The method of claim 31, further comprising the steps of:

displaying a data set sub-window in the interchange window; and displaying a data set of the interchange in the data set sub-window.

37. The method of claim 31, further comprising the steps of:

displaying a translation report sub-window in the interchange window; and displaying a translation report of the interchange in the translation report sub-window.

38. The method of claim 31, further comprising the steps of:

displaying a document entry associated with a document of the interchange;

displaying a data set sub-window in the interchange window; and displaying a data set of the document in the data set sub-window.

39. The method of claim 31, further comprising the steps of:

displaying a document entry associated with a document of the interchange;

displaying a translation report sub-window in the interchange window; and displaying a translation report of the document in the translation report sub-window.

40. A method for displaying EDI messages in a computer, comprising the steps of:

displaying an interchange window including at least one interchange entry associated with an interchange of an EDI message;

displaying a translation report sub-window in the interchange window; and displaying a translation report of the interchange in the translation report sub-window.

41. The method of claim 40, further comprising the steps of:

displaying in the interchange window a document entry associated with a document of the interchange; and displaying a translation report of the document in the translation report sub-window.

42. The method of claim 40, further comprising the steps of:

displaying a data set sub-window in the interchange window; and displaying a data set of the interchange in the data set sub-window.

43. The method of claim 42, further comprising the steps of:

displaying in the interchange window a document entry associated with a document of the interchange; and displaying a data set of the document in the data set sub-window.

44. The method of claim 40, further comprising the step of displaying a functional group entry associated with a functional group of the interchange.

45. The method of claim 40, further comprising the step of displaying a document entry associated with a document of the interchange.

46. A method for displaying EDI messages in a computer, comprising the steps of:

displaying an interchange window including at least one interchange entry associated with an interchange of an EDI message; and displaying a functional group entry associated a functional group of the interchange.

47. The method of claim 46, further comprising the step of displaying a document entry associated a document of the interchange.

48. The window of claim 46, further comprising the steps of:

displaying a document entry associated a document of the interchange; and displaying a status icon representing the status of document.

* * * * *